United States Patent
Chung

(10) Patent No.: US 7,118,824 B2
(45) Date of Patent: Oct. 10, 2006

(54) SECONDARY BATTERY WITH IMPROVED FINISHING TAPE AND METHOD OF MAKING THE SECONDARY BATTERY

(75) Inventor: Hyun-jei Chung, Asan (KR)

(73) Assignee: Samsung SDI Co., Ltd., Suwon (KR)

( * ) Notice: Subject to any disclaimer, the term of this patent is extended or adjusted under 35 U.S.C. 154(b) by 174 days.

(21) Appl. No.: 10/277,060

(22) Filed: Oct. 22, 2002

(65) Prior Publication Data

US 2003/0087150 A1 May 8, 2003

(30) Foreign Application Priority Data

Nov. 6, 2001 (KR) ............... 2001-68814

(51) Int. Cl.
*H01M 6/10* (2006.01)
*H01M 2/14* (2006.01)

(52) U.S. Cl. .................. 429/94; 429/129; 429/131; 429/133; 429/136

(58) Field of Classification Search ............ 429/94, 429/129, 131, 133, 136
See application file for complete search history.

(56) References Cited

U.S. PATENT DOCUMENTS 5,747,188 A * 5/1998 Von Sacken et al. ......... 429/61

FOREIGN PATENT DOCUMENTS

| EP | 1 104 040 | | 5/2001 |
|----|-----------|---|--------|
| JP | 6-150971 | | 5/1994 |
| JP | 10-241744 | * | 9/1998 |
| JP | 2001-155774 | | 6/2001 |
| JP | 2001-185224 | | 7/2001 |
| JP | 2001-273931 | | 10/2001 |

OTHER PUBLICATIONS

Dupont, kapton polyimide film, www.dupont.com, 2003.*

* cited by examiner

*Primary Examiner*—Patrick Joseph Ryan
*Assistant Examiner*—Angela J. Martin
(74) *Attorney, Agent, or Firm*—Leydig, Voit & Mayer, Ltd.

(57) ABSTRACT

A secondary battery with a finishing tape preventing air bubbles from being formed between a jelly roll electrode structure and the finishing tape. The secondary battery includes a wound electrode assembly having a positive electrode sheet, a separator, and a negative electrode sheet, sequentially stacked, and a finishing tape having penetrating holes and adhered to the outer lateral surface of the wound electrode assembly. The penetrating holes permit air to escape, preventing the formation of air bubbles under the tape. The secondary battery may be made by sequentially stacking a positive electrode sheet, a separator, and a negative electrode sheet to form an electrode structure, adhering a finishing tape to a surface of one of the positive and negative electrode sheets of the electrode structure, the finishing tape including penetrating holes, applying tension to a free end of the finishing tape and winding the electrode structure in a spiral with the finishing tape covering and adhered to the electrode structure as an outside surface, whereby air trapped between the electrode structure and the finishing tape during winding passes through the penetrating holes, preventing formation of air bubbles between the finishing tape and the electrode structure. Alternatively, the secondary battery may be made by sequentially stacking a positive electrode sheet, a separator, and a negative electrode sheet to form an electrode structure, winding the electrode structure in a spiral having an outside surface, and adhering a finishing tape including penetrating holes to the outside surface by winding the tape around the spiral, covering the outside surface and adhering the finishing tape to itself, so that air trapped between the electrode structure and the finishing tape during winding passes through the penetrating holes, preventing formation of air bubbles between the finishing tape and the electrode structure.

12 Claims, 5 Drawing Sheets

SECONDARY BATTERY WITH IMPROVED FINISHING TAPE AND METHOD OF MAKING THE SECONDARY BATTERY

BACKGROUND OF THE INVENTION

1. Field of the Invention

The present invention relates to a secondary battery, a method of making the secondary battery, and, more particularly, to a secondary battery with an improved finishing tape, preventing the formation of air bubbles under the tape when a jelly roll electrode structure of the secondary battery is wound.

2. Description of the Related Art

Lithium secondary batteries are capable of charging and discharging and are rapidly developing because of their high operating voltage and their excellent energy densities per unit weight, compared to nickel-cadmium (Ni—Cd) batteries and nickel-hydride (Ni—MH) batteries. Lithium secondary batteries can be classified into liquid electrolyte batteries and polymer electrolyte batteries according to the kind of electrolyte used. In general, a battery using a liquid electrolyte is referred to as a lithium-ion battery, and a battery using a polymer electrolyte is referred to as a lithium polymer battery.

Specifically, a secondary battery using a liquid electrolyte employs an jelly roll electrode structure having positive and negative electrode sheets respectively coated with positive and negative electrode active materials with a separator interposed therebetween. This structure is wound in a spiral referred to as a jelly roll shape. An electrode assembly having the jelly roll shape is housed in a battery case, such as a can or pouch, and an electrolytic solution is injected into the battery case.

In winding the positive electrode sheet, the separator, and the negative electrode sheet, which are sequentially stacked, it is necessary to complete the wound electrode jelly roll with an adhesive tape so that the jelly roll does not unwind. Usually an adhesive tape is applied during this finishing process. The tape, generally called a finishing tape, has an adhesive side adhered to the outer layer of the battery structure and to itself to hold the jelly roll structure in a wound state.

Referring to FIG. 1A, a jelly roll electrode structure 10 includes a finishing tape 20 to hold an outermost end 16 of the jelly roll structure 10. That structure has a positive electrode tab 12 and a negative electrode tab 14, and a finishing tape 20 is kept wrapped around the jelly roll structure and is the outermost end 16. More generally, as shown in FIG. 1A, the finishing tape 20 is attached before winding the jelly roll and the finishing tape 20 is used to wind the jelly roll 10. In addition, the tape provides electrical insulation between the jelly roll 10 and the inside of the battery case (not shown) in which the jelly roll is placed.

The finishing tape 20 is made from a thin, polymeric film. As a result, air may be trapped at an adhered surface between the finishing tape 20 and the jelly roll 10. The air entrapped portions 22 produce air bubbles, as shown in FIG. 1B. The air bubbles make the surface of the jelly roll non-uniform, increase battery volume, and can interfere with insertion of the jelly roll 10 in a battery case and be ruptured in placing the jelly roll in a case. The entrapped air portions 22 occur because the finishing tape 20, made, for example, from a thin polyvinyl material, has a trailing end adhered to the jelly roll 10 before a leading end is adhered to the jelly roll 10, so a continuous taping process impossible.

Japanese Patent Laid-open Publication No. 2001-155774 discloses a non-aqueous electrolyte secondary battery in which a current collector for a positive or negative electrode is exposed, without winding a separator around the outermost portion of an electrode. A finishing tape is wound, leaving a portion of the electrode assembly exposed. However, the finishing tape of the non-aqueous secondary battery still has the problems described above.

Japanese Patent Laid-open Publication No. 2001-185224 discloses a secondary battery having a narrow finishing tape for winding an electrode assembly widthwise and lengthwise. However, taping lengthwise makes the manufacturing process complex, and entrapped air portions still remain, even if the finishing taping is narrow.

To effectively expel gas generated in an electrode assembly during charging and discharging cycles, Japanese Patent Laid-open Publication No. 2001-273931 discloses a battery having an insulating tape with exhaust holes. The tape is attached to the lower portion of an electrode assembly. However, the insulating tape is not a finishing tape that can result in trapping air in finishing of a jelly roll electrode structure.

SUMMARY OF THE INVENTION

To solve the problems described, it is an object of the present invention to provide a method for manufacturing a secondary battery which prevents air bubbles from remaining after winding a finishing tape on the entire surface of a jelly roll electrode structure. The finishing tape includes a plurality of holes for the escape of air during winding of the jelly roll electrode structure.

To achieve the above objective of the present invention, there is provided a secondary battery including a wound electrode assembly having a positive electrode sheet, a separator, and a negative electrode sheet sequentially stacked and wound in a spiral, and a finishing tape having a plurality of penetrating holes, the tape being adhered to an outer surface of the wound electrode assembly and to the finishing tape itself, the penetrating holes permitting escape of air from between the outer surface of the wound electrode assembly and the finishing tape.

Preferably, the holes in the finishing tape, which may be uniformly or non-uniformly arranged, are circular.

A method of producing a secondary battery according to the invention, includes sequentially stacking a positive electrode sheet, a separator, and a negative electrode sheet to form an electrode structure, adhering a finishing tape to a surface of one of the positive and negative electrode sheets of the electrode structure, the finishing tape including a plurality of penetrating holes, and applying tension to a free end of the finishing tape and winding the electrode structure in a spiral, with the finishing tape covering and adhered to the electrode structure as an outside surface, so that air trapped between the electrode structure and the finishing tape during winding passes through the penetrating holes, preventing formation of air bubbles between the finishing tape and the electrode structure.

Another method of producing a secondary battery according to the invention includes sequentially stacking a positive electrode sheet, a separator, and a negative electrode sheet to form an electrode structure, winding the electrode structure in a spiral having an outside surface, and adhering a finishing tape including a plurality of penetrating holes to the outside surface by winding the tape around the spiral, covering the outside surface and adhering the finishing tape to itself, so that air trapped between the electrode structure and the finishing tape during winding passes through the penetrating holes, preventing formation of air bubbles between the finishing tape and the electrode structure.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of the present invention will now be described in detail with reference to the accompanying drawings.

Figure 1A:
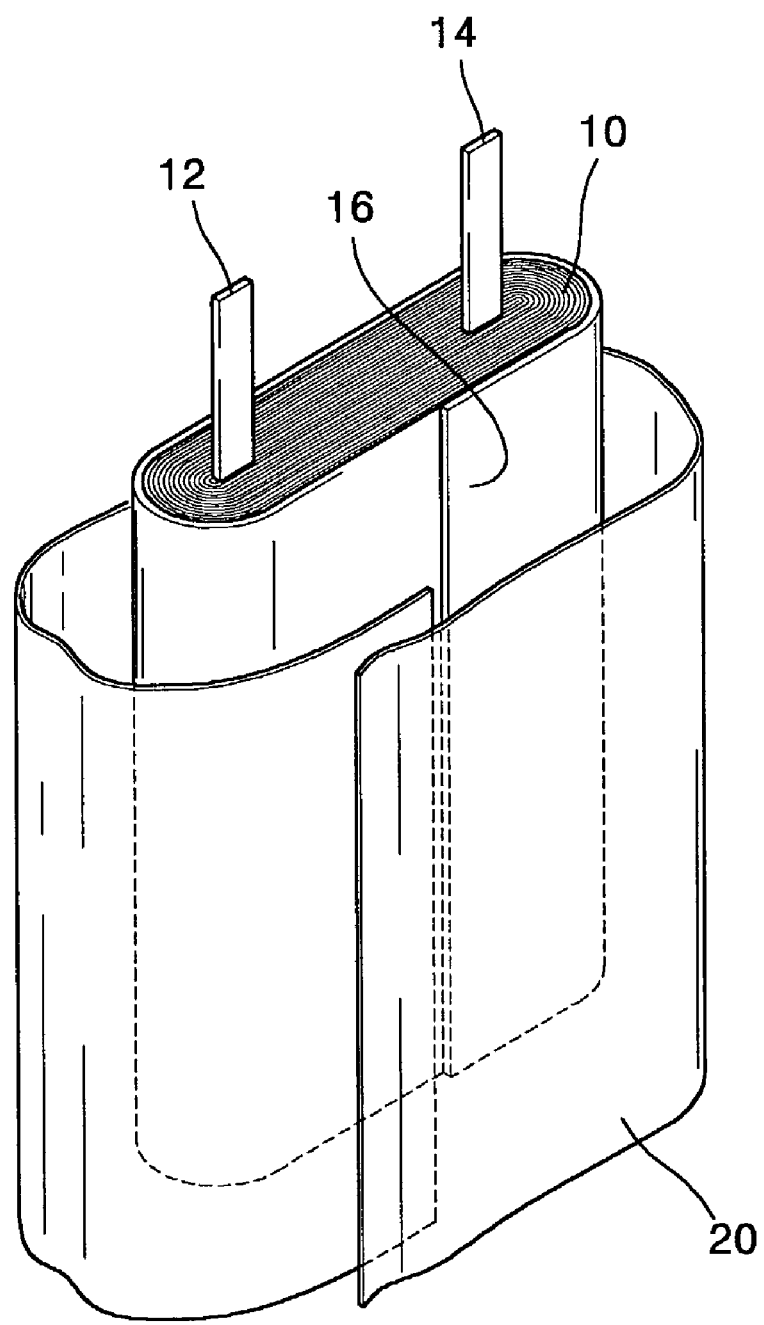
FIG. 1A illustrates a finishing tape wound on a conventional jelly roll electrode structure.
Figure 1B:
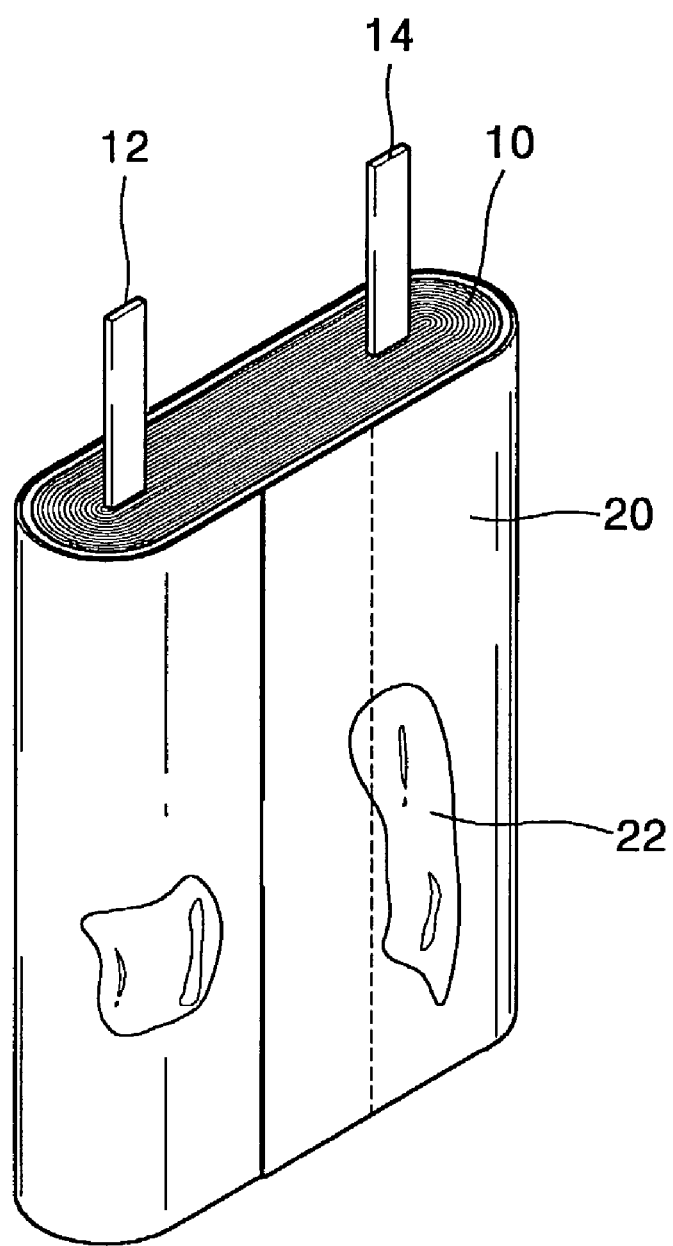
FIG. 1B illustrates entrapped air portions formed underneath the finishing tape when the finishing tape is wound as shown in FIG. 1A.
Figure 2A:
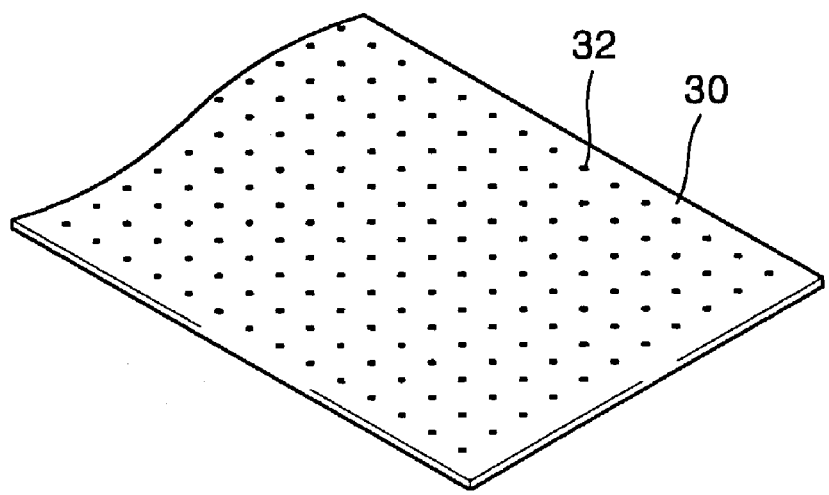
FIGS. 2A and 2B are perspective views of finishing tapes according to the present invention.

FIG. 2A illustrates a finishing tape 30 according to the present invention. The finishing tape 30 can be made from various materials and the materials used may be electrically insulating or electrically conducting. In the former case, the tape electrically insulates the jelly roll electrode structure from a battery case, whereas the electrically conducting tape provides an electrical connection to the battery case. Preferably, the finishing tape is a polymer tape such as polyvinyl.

As shown in FIG. 2A, the finishing tape 30 has a plurality of holes 32 passing therethrough. In the tape depicted in FIG. 2A, the holes 32 are regularly arranged at uniform intervals in a uniform pattern. The holes prevent air bubbles from being formed on the surface of the jelly roll electrode structure wound using the finishing tape 30. Preferably, the finishing tape 30 includes an adhesive on one side for adhering to the outermost layer of the jelly roll electrode structure and to the finishing tape 30 itself.

Figure 2B:
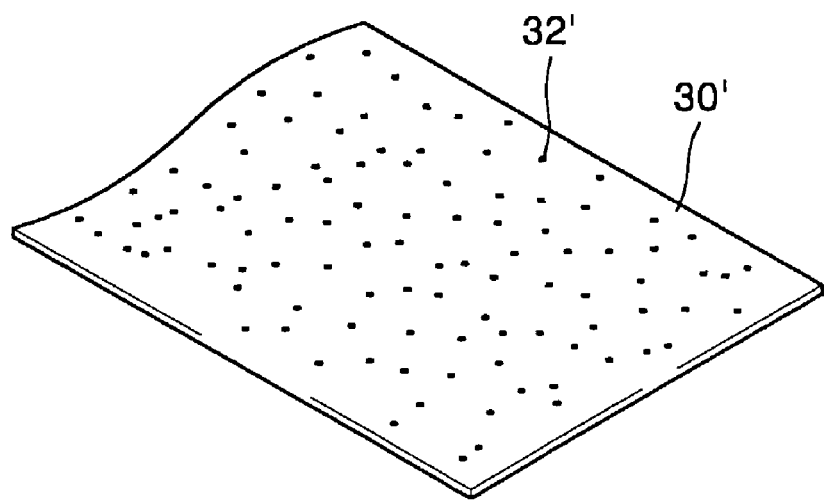

FIG. 2B shows another finishing tape, 30' having holes 32' not arranged in a uniform pattern as in the tape 30. Rather, the arrangement of the holes 32' is irregular and not in any uniform pattern. While FIGS. 3 and 4 show embodiments with the tape 30, the tape 30' may also be used in those embodiments.

The finishing tape is adhered to the jelly roll and wound with an applied tensile force to form the outside surface of the jelly roll. If the holes 32 and 32' in the finishing tapes 30 and 30' are too large, portions of the holes 32 subjected to the tensile force in winding the finishing tape may become enlarged and distorted or the finishing tape may tear. Thus, the holes in the finishing tape are preferably as small as possible, so that they are little affected by the tensile force. The holes are preferably as small as pin holes. Further, the holes are preferably circular or oval in shape. If the holes are angled at the tape surface, cracking may occur in the finishing tape when the finishing tape is wound on or used to wind the electrode jelly roll with an applied tensile force.

Figure 3:
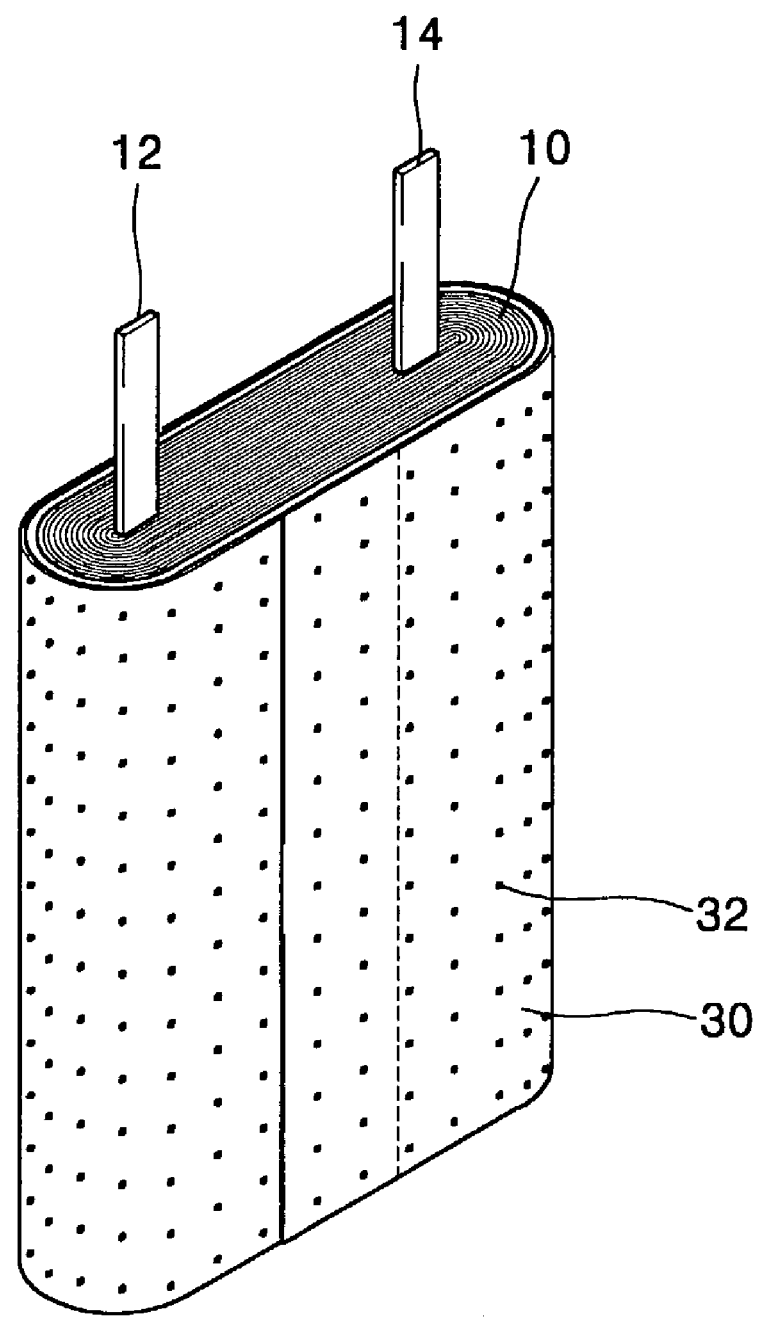
FIG. 3 illustrates a finishing tape according to the present invention wound on an electrode assembly of a prismatic battery.

FIG. 3 illustrates the finishing tape 30 having the holes 32 attached to a wound electrode assembly 10 of a prismatic battery. Referring to FIG. 3, as the finishing tape 30 having the holes 32 is wound around the lateral surface of the electrode assembly 10 and adhered thereto, air trapped and generating air bubbles between the surface of the electrode assembly 10 and the finishing tape 30 escapes through the holes 32, significantly reducing air bubbles. The same effect is achieved if the finishing tape 30' is used.

Figure 4:
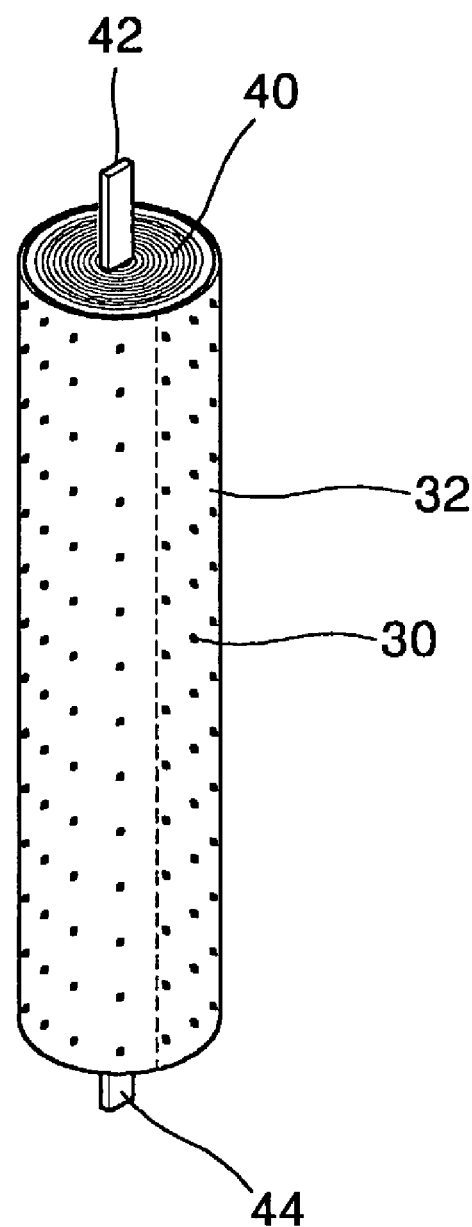
FIG. 4 illustrates a finishing tape according to the present invention wound on an electrode assembly of a cylindrical battery.

Similarly, the finishing tape 30 can be applied to a circular cross-section electrode assembly 40, as shown in FIG. 4. Reference numerals 42 and 44 denote a positive electrode tab and a negative electrode tab, respectively. Again, the finishing tape 30' may alternately be employed in this embodiment.

Although not shown, the finishing tape according to the present invention can also be applied to the case. In that arrangement, the tape fixes the outermost end of a wound electrode assembly, rather than being used for winding the electrode assembly.

A secondary battery having the finishing tape according to the present invention has the following advantages and effects.

First, trapped air does not remain between the surface of an electrode assembly and the finishing tape.

Second, an increase in the volume of the electrode assembly is avoided.

Third, time expended in removing trapped air is reduced, increasing efficiency in manufacturing.

While this invention has been particularly shown and described with reference to preferred embodiments, it will be understood by those skilled in the art that various changes in form and details may be made without departing from the spirit and scope of the invention as defined by the appended claims.

What is claimed is:

1. A secondary battery comprising:
   a wound electrode assembly having a positive electrode sheet, a separator, and a negative electrode sheet sequentially stacked and wound in a spiral; and
   a finishing tape having a plurality of penetrating pin holes, the tape including an adhesive on one side and being adhered to an outer surface of the wound electrode assembly and to the finishing tape itself by the adhesive, the penetrating pin holes permitting escape of air from between the outer surface of the wound electrode assembly and the finishing tape and from between overlapping parts of the finishing tape so that the finishing tape is free of air trapped between overlapping parts of the finishing tape and between the finishing tape and the wound electrode assembly.

2. The secondary battery according to claim 1, wherein the holes in the finishing tape are arranged in a pattern with uniform spacing.

3. The secondary battery according to claim 1, wherein the holes in the finishing tape are arranged with non-uniform spacing.

4. The secondary battery according to claim 1, wherein the holes in the finishing tape are circular in cross-section.

5. A method of making a secondary battery comprising:
   sequentially stacking a positive electrode sheet, a separator, and a negative electrode sheet to form an electrode structure;
   adhering a finishing tape having an adhesive on one side to a surface of one of the positive and negative electrode sheets of the electrode structure, the finishing tape including a plurality of penetrating pin holes for passage of air; and applying tension to a free end of the finishing tape, winding the electrode structure in a spiral, with the finishing tape covering and adhered to the electrode structure by the adhesive, as an outside surface, and passing air from between the electrode structure and the finishing tape, during winding, through the penetrating holes, preventing formation of bubbles of trapped air between the finishing tape and the electrode structure.

6. The method of claim 5 wherein the holes in the finishing tape are arranged in a pattern with uniform spacing.

7. The method of claim 5 wherein the holes in the finishing tape are arranged with non-uniform spacing.

8. The method of claim 5 wherein the holes in the finishing tape are circular in cross-section.

9. A method of making a secondary battery comprising:
sequentially stacking a positive electrode sheet, a separator, and a negative electrode sheet to form an electrode structure;
winding the electrode structure in a spiral having an outside surface; and
adhering a finishing tape, having an adhesive on one side and including a plurality of penetrating pin holes, to the outside surface by winding the tape around the spiral, covering the outside surface, adhering the finishing tape to itself with the adhesive, and passing air from between the electrode structure and the finishing tape and from between overlapping parts of the finishing tape, during winding, through the penetrating holes, preventing formation of bubbles of trapped air between overlapping parts of the finishing tape and between the finishing tape and the electrode structure.

10. The method of claim 9 wherein the holes in the finishing tape are arranged in a pattern with uniform spacing.

11. The method of claim 9 wherein the holes in the finishing tape are arranged with non-uniform spacing.

12. The method of claim 9 wherein the holes in the finishing tape are circular in cross-section.

* * * * *